(12) United States Patent
Bucur et al.

(10) Patent No.: US 8,248,259 B2
(45) Date of Patent: Aug. 21, 2012

(54) PROTECTION CIRCUIT WITH TIMER

(75) Inventors: Constantin Bucur, Sunnyvale, CA (US); William Densham, Los Gatos, CA (US); Jiun Heng Goh, Sunnyvale, CA (US); Flavius Lupu, San Jose, CA (US)

(73) Assignee: O2Micro, Inc, Santa Clara, CA (US)

( * ) Notice: Subject to any disclaimer, the term of this patent is extended or adjusted under 35 U.S.C. 154(b) by 372 days.

(21) Appl. No.: 12/321,257

(22) Filed: Jan. 16, 2009

(65) Prior Publication Data

US 2010/0182156 A1 Jul. 22, 2010

(51) Int. Cl.
*G08B 21/00* (2006.01)

(52) U.S. Cl. .................................................... 340/638

(58) Field of Classification Search .................. 340/638, 340/572.7, 572.1
See application file for complete search history.

(56) References Cited

U.S. PATENT DOCUMENTS

| 4,692,680 A * | 9/1987 | Sherer | 320/103 |
| 5,180,961 A | 1/1993 | Tsujino | |
| 2008/0180059 A1 * | 7/2008 | Carrier et al. | 320/112 |

FOREIGN PATENT DOCUMENTS

CN 2888709 Y 4/2007

* cited by examiner

*Primary Examiner* — Shirley Lu

(57) ABSTRACT

A protection circuit includes a detection block, a timer and a protection enable block. The detection block is used to compare a monitoring signal with a reference signal and generate an alert signal if a difference between the monitoring signal and the reference signal exceeds a threshold for a first predetermined duration. The timer coupled to the detection block is used to generate an enabling signal for a second predetermined duration in response to the alert signal. The protection enable block coupled to the timer is used to generate a triggering signal for a first time duration determined by the second predetermined duration in response to the enabling signal so as to perform a protection function.

24 Claims, 6 Drawing Sheets

PROTECTION CIRCUIT WITH TIMER

BACKGROUND

Currently, batteries, for example, the Li-ion batteries, are widely used to provide power supply to varieties of battery-powered devices, such as notebook computers, electric vehicles (EVs), hybrid electric vehicles (HEVs) and power tools. A charging circuit is typically used to charge the battery. During a charging process, undesired conditions of the battery, such as over-voltage, under-voltage, over-current and over-temperature conditions, may shorten the battery life.

A protection apparatus can be employed to protect the battery. FIG. 1 shows a conventional protection apparatus 100. The protection apparatus 100 includes a detection block 120 and a protection enable block 180.

The status of each cell in the battery, such as cell voltage, cell current and cell temperature, can be monitored. A monitoring signal 101 is sent to the detection block 120. The detection block 120 checks the monitoring signal 101 to detect an undesired condition in the battery. When the undesired condition is detected, the detection block 120 sends an alert signal 152 to the protection enable block 180. The protection enable block 180 can generate a triggering signal 158 to burn a fuse and thus the battery can be disconnected from the charging circuit.

However, the robustness of the fuse may be deteriorated in the conventional protection apparatus 100. For example, an undesired condition which may be caused by the voltage glitches can be detected by the detection block 120. The triggering signal 158 is generated to burn the fuse. Before the fuse is completely burnt, the undesired condition may be recovered and thus the protection process can be suddenly suspended. Consequently, the robustness of the fuse may be deteriorated due to frequent starting and suspending of the protection process. Thus, the fuse may need to be replaced frequently.

SUMMARY

In one embodiment, a protection circuit includes a detection block, a timer and a protection enable block. The detection block is used to compare a monitoring signal with a reference signal and generate an alert signal if a difference between the monitoring signal and the reference signal exceeds a threshold for a first predetermined duration. The timer coupled to the detection block is used to generate an enabling signal for a second predetermined duration in response to the alert signal. The protection enable block coupled to the timer is used to generate a triggering signal for a first time duration determined by the second predetermined duration in response to the enabling signal so as to perform a protection function.

BRIEF DESCRIPTION OF THE DRAWINGS

Features and advantages of embodiments of the present invention will become apparent as the following detailed description proceeds, and upon reference to the drawings, wherein like numerals depict like parts, and in which.

DETAILED DESCRIPTION

Figure 1:
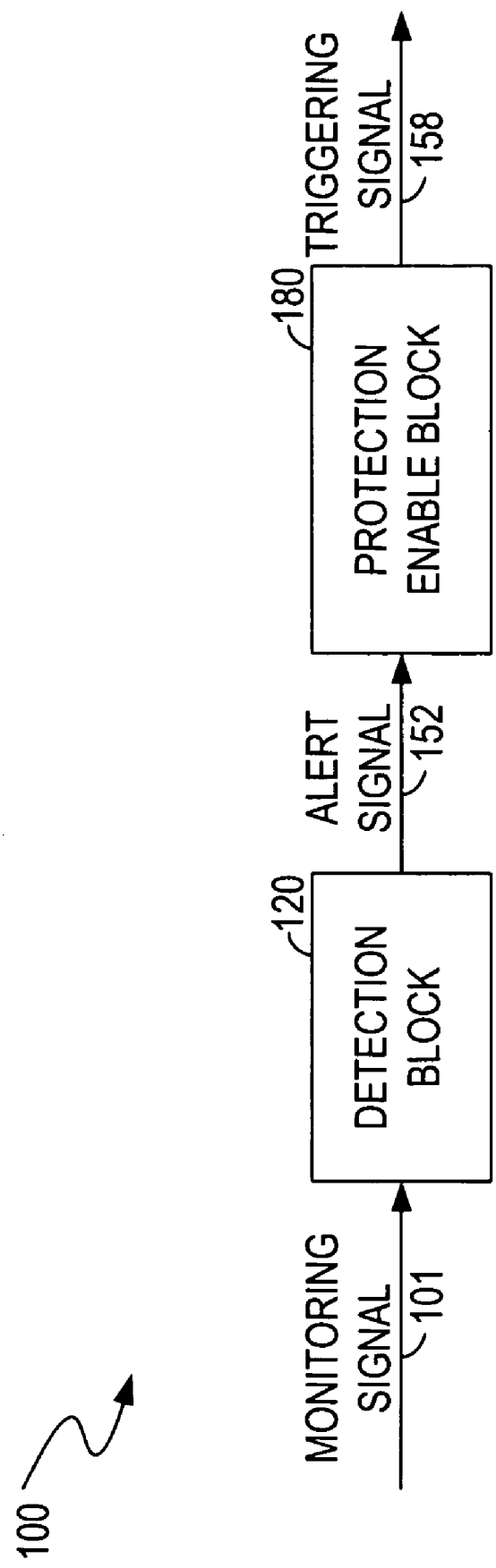
FIG. 1 is a block diagram showing a protection apparatus in the prior art.

Reference will now be made in detail to the embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "comparing," "generating," "measuring," "resetting," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Embodiments in accordance with the present invention provide a protection circuit. When the difference between a monitoring signal and a reference signal exceeds a threshold for a first predetermined duration, an enabling signal is generated for a second predetermined duration by a timer to start a protection process. Advantageously, during the second predetermined duration, a breaker, e.g., a fuse coupled between a battery and a charging circuit, can be completely turned off and thus the protection process will not be suspended, in one embodiment.

Figure 2:
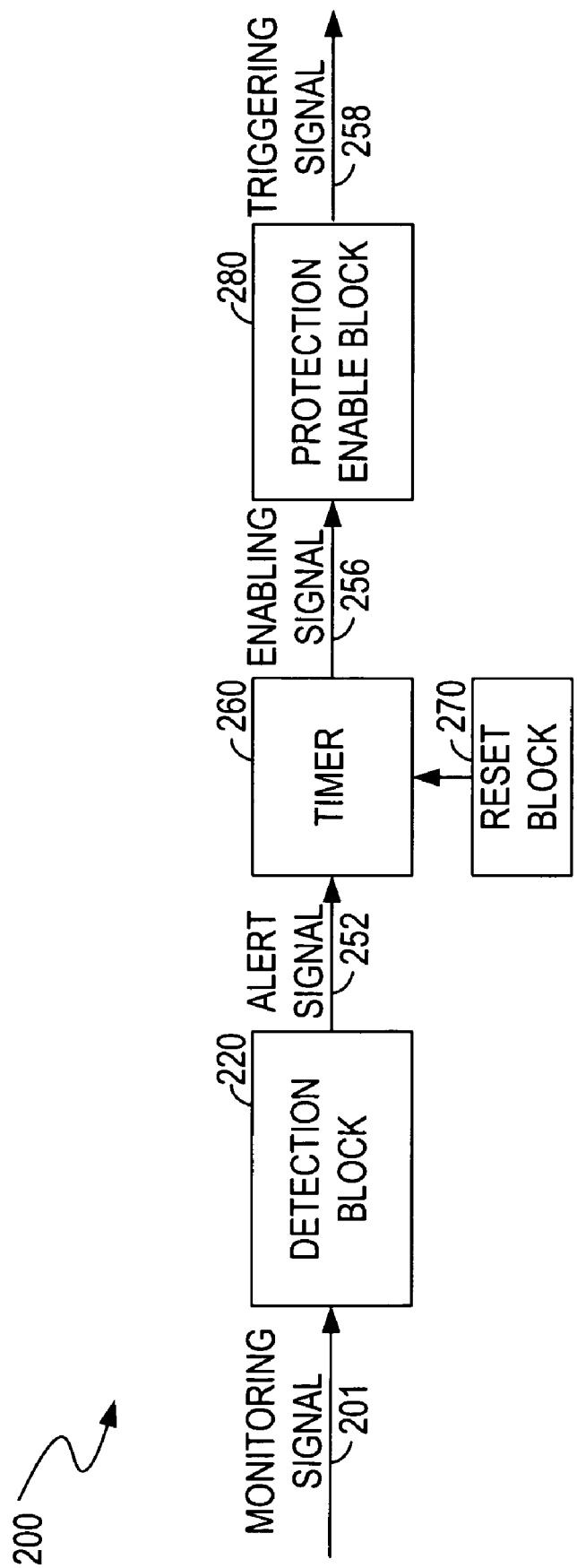
FIG. 2 is a block diagram showing a protection circuit according to one embodiment of the present invention.

FIG. 2 shows a protection circuit 200 according to one embodiment of the present invention. In the embodiment of FIG. 2, the protection circuit 200 includes a detection block 220, a timer 260 and a protection enable block 280. A monitoring signal 201 can indicate a status of a protection object. For example, the monitoring signal 201 indicative of a status of a battery, such as battery voltage, cell voltage, cell current and cell temperature, etc., can be input into the detection block 220. A triggering signal 258 output by the protection enable block 280 can be used to trigger a protection function, for example, to disconnect the battery from a charging circuit.

The detection block 220 can compare the monitoring signal 201 with a reference signal for detecting an undesired condition occurs, e.g., in a battery. The undesired condition can include, but is not limited to, over voltage, under voltage, over current, over temperature conditions. If a difference between the monitoring signal 201 and the reference signal exceeds a threshold for a first predetermined duration, the detect block 220 can determine the undesired condition occurs and can generate an alert signal 252 to the timer 260.

The timer 260 coupled to the detection block 220 can generate an enabling signal 256 for a second predetermined duration in response to the alert signal 252. The enabling signal 256 is further provided to the protection enable block 280. The protection enable block 280 coupled to the timer 260 can generate a triggering signal 258 for a time duration determined by the second predetermined duration in response to the enabling signal 256 so as to perform a protection function. For example, the battery can be disconnected from the charging circuit if a triggering signal 258 is generated by the protection enable block 280.

Advantageously, the timer 260 can generate the enabling signal 256 for a predetermined duration. As a result, the triggering signal 258 can also be generated for a predetermined duration which is long enough to allow a fuse coupled between the battery and the charging circuit to be completely burnt. In other words, when an undesired condition is detected by the detection block 220, duration of the signal for performing the protection function can be sufficiently long to burn down the fuse. As a result, in one embodiment, the protection process will not be suspended due to frequent voltage glitches.

In one embodiment, the protection circuit 200 further includes a reset block 270 coupled to the timer 260 for resetting the timer 260. In one embodiment, the reset block 270 resets the timer 260 after the second predetermined duration expires.

Figure 3:
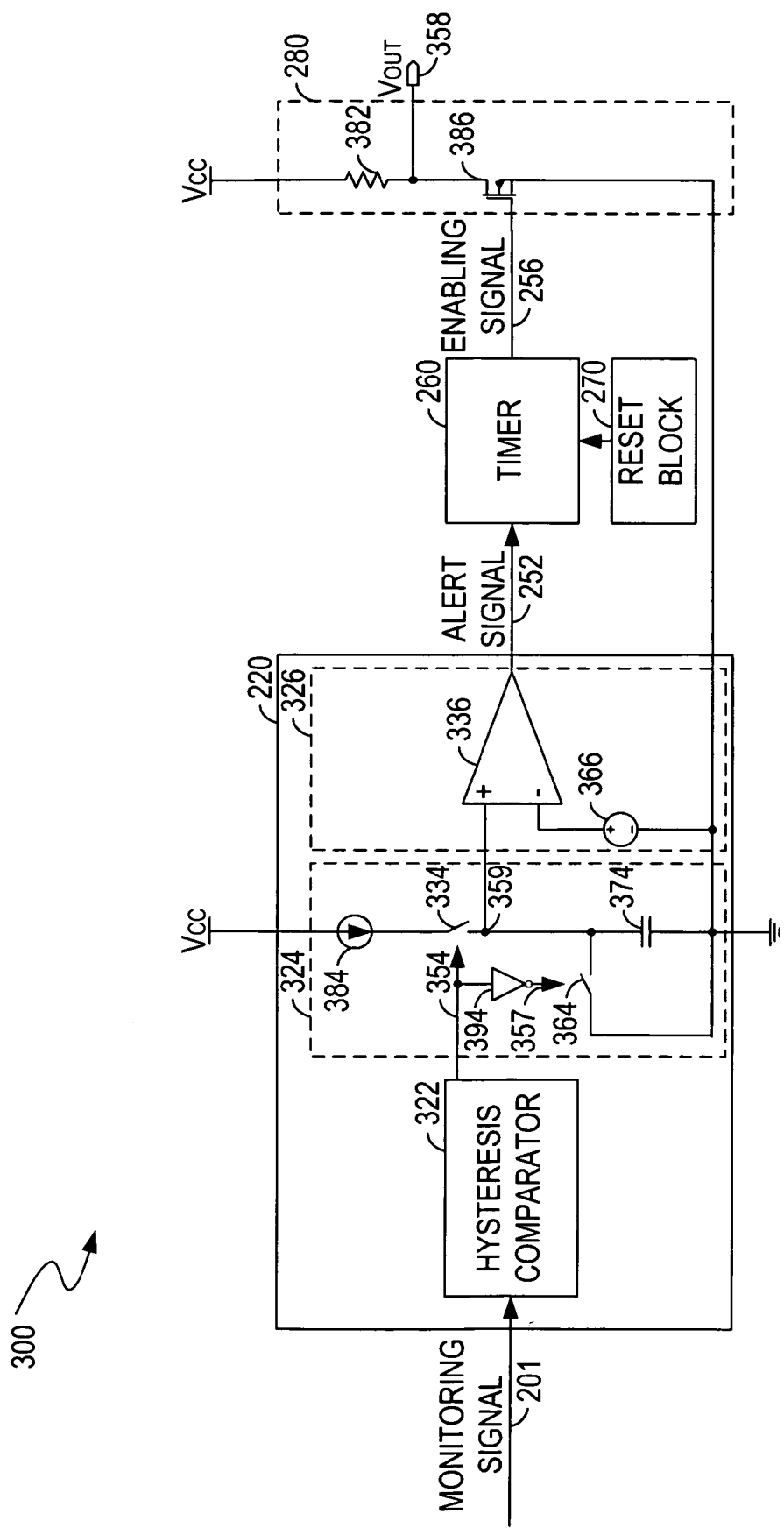
FIG. 3 is a detailed block diagram showing a protection circuit according to one embodiment of the present invention.

FIG. 3 shows a detailed block diagram of the protection circuit 300 according to one embodiment of the present invention. Elements labeled the same as in FIG. 2 have similar functions. In the embodiment of FIG. 3, the protection circuit 300 includes the detection block 220, the timer 260 and the protection enable block 280. The monitoring signal 201 indicative of the status of the battery, e.g., battery voltage, cell voltage, cell temperature, battery current, can be input into the protection circuit 300. An output voltage $V_{OUT}$ output by the protection circuit 300 can be provided to burn a fuse.

In the embodiment of FIG. 3, the detection block 220 includes a first comparator 322, a measuring block 324 and a confirming block 326. The first comparator 322 compares the monitoring signal 201 with a reference signal. In one embodiment, if the difference between the monitoring signal 201 and the reference signal exceeds a threshold, a signal 354 which is logic "1" is generated by the first comparator 322. Otherwise, the signal 354 is logic "0". The signal 354 is output to the measuring block 324. In one embodiment, the first comparator 322 is a hysteresis comparator.

The measuring block 324 can be used for measuring a time duration T when the difference between the monitoring signal 201 and the reference signal exceeds the threshold. The measuring block 324 can include a current source 384, a first switch 334, a second switch 364, a capacitor 374 and an inverter gate 394. The first switch 334 and the capacitor 374 couple the current source 384 to ground. The second switch 364 is coupled in parallel with the capacitor 374. The signal 354 output by the first comparator 322 is input to the inverter gate 394. Accordingly, a signal 357 is generated. The first switch 334 is controlled by the signal 354 and the second switch 364 is controlled by the signal 357, in one embodiment.

In one embodiment, if the difference between the monitoring signal 201 and the reference signal exceeds the threshold, the signal 354 which is logic "1" is generated. Thus, the first switch 334 is turned on and the second switch 364 is turned off, in one embodiment. The capacitor 374 can be charged by the current source 384. As such, the voltage at a node 359, which is the voltage drop across the capacitor 374, can be increased and provided to the confirming block 326.

The confirming block 326 coupled to the measuring block 324 is operable for comparing the time duration T (when the difference between the monitoring signal 201 and the reference signal exceeds the threshold) with the aforementioned first predetermined duration and for generating the alert signal 252 if the time duration T is greater than the first predetermined duration. The confirming block 326 can include a comparator 336 and a reference voltage 366. The voltage output by the measuring block 324 can be provided to a non-inverting input terminal of the comparator 336. The reference voltage 366 can be provided to an inverting input terminal of the comparator 336. The comparator 336 compares the voltage output by the measuring block 324 and the reference voltage 366 to determine if an undesired condition occurs. For example, if the voltage output by the measuring block 324 is higher than the reference voltage 366, which indicates that the time duration T (when the difference between the monitoring signal 201 and the reference signal exceeds the threshold) is greater than the first predetermined duration, the confirming block 226 can determine the undesired condition occurs and generate an alert signal 252 to the timer 260.

Once the timer 260 receives the alert signal 252, an enabling signal 256 can be generated and output to the protection enable block 280. As described above, the enabling signal 256 can have a second predetermined duration. The second predetermined duration can be counted by the timer 260.

In the embodiment of FIG. 3, the protection enable block 280 includes a resistor 382 and a switch 386 (e.g., a FET). The resistor 382 and the switch 386 couple a power supply $V_{CC}$ to ground. The switch 386 can be controlled by the enabling signal 256. Accordingly, the output voltage $V_{OUT}$ at a node 358 is generated. In one embodiment, the output voltage $V_{OUT}$ can be used to perform a protection function, e.g., to burn a fuse. The duration of the enabling signal 256 can be sufficiently long such that the fuse can be completely burnt.

In one embodiment, the protection circuit 300 further includes a reset block 270 coupled to the timer 260 for resetting the timer 260. In one embodiment, reset block 270 resets the timer 260 after the second predetermined duration expires.

Figure 4:
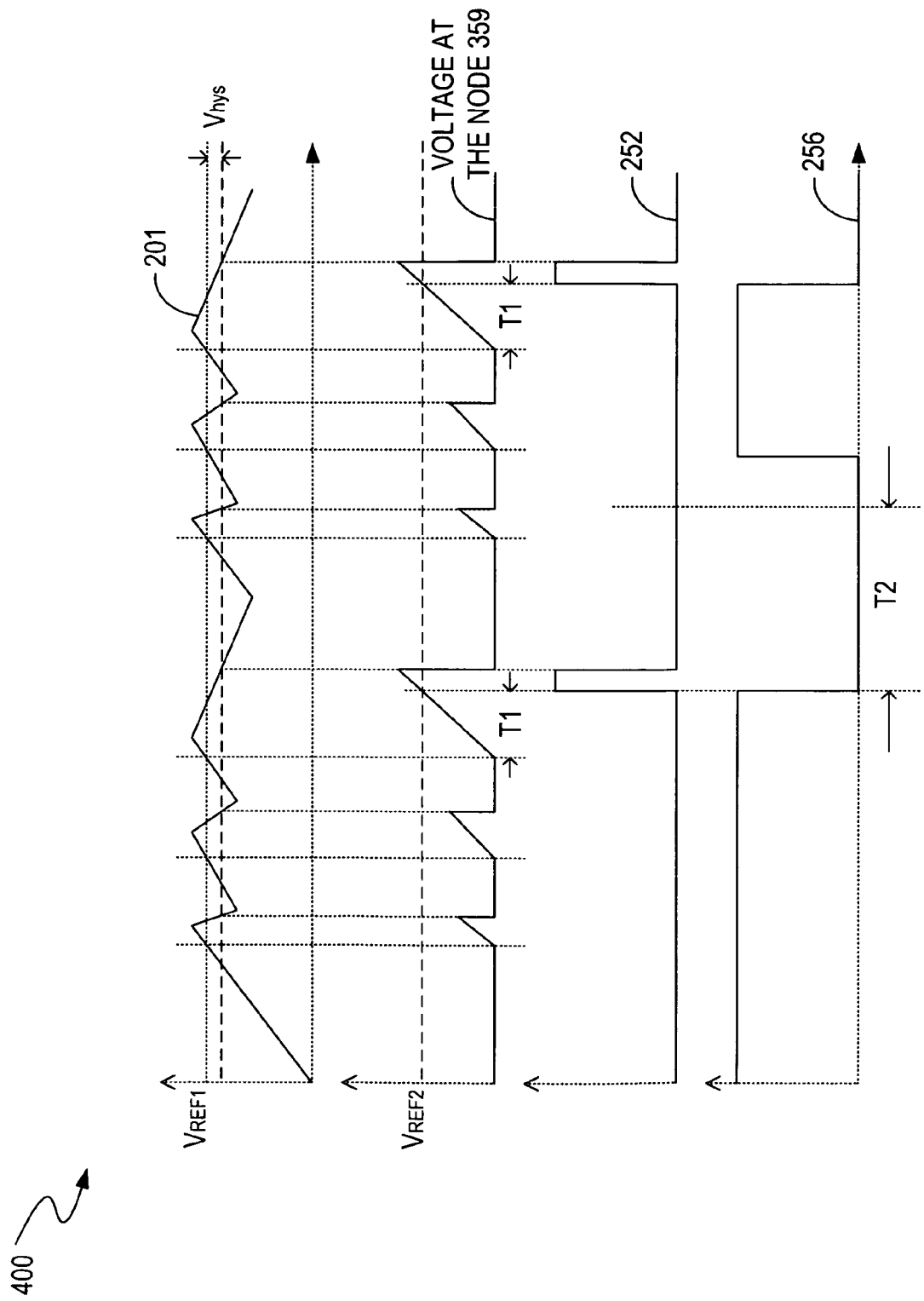
FIG. 4 is a diagram showing waveforms of a protection circuit according to one embodiment of the present invention.

FIG. 4 shows waveforms of the protection circuit according to one embodiment of the present invention. The FIG. 4 is described in combination with FIG. 3. Four waveforms shown in the FIG. 4 respectively indicate the monitoring signal 201, the voltage at the node 359, the alert signal 252 and the enabling signal 256. In one embodiment, the first comparator 322 can be a hysteresis comparator, and a voltage $V_{hys}$ is a hysteresis voltage.

The first comparator 322 compares the monitoring signal 201 with a reference voltage $V_{REF1}$. When the difference between the monitoring signal 201 and the reference voltage $V_{REF1}$ exceeds a threshold, the first comparator 322 generates the signal 354 which is logic "1" to the measuring block 324. Thus, the switch 334 is turned on and the switch 364 is turned off. The capacitor 374 is charged by the current source 384 and the voltage at the node 359 is increased accordingly. The comparator 336 compares the voltage at the node 359 with a reference voltage $V_{REF2}$. When the voltage at the node 359 is higher than a reference voltage $V_{REF2}$, which indicates that the time duration T (when the difference between the monitoring signal 201 and the reference voltage $V_{REF1}$ exceeds the threshold) is greater than a first predetermined duration T1, the confirming block 326 confirms that the undesired condition occurs, and the alert signal 252 which is logic "1" is generated. Once the timer receives the alert signal 252, the enabling signal 256 is generated for a second predetermined duration T2. The enabling signal 256 can be reset by the reset block after the second predetermined duration T2 expires. Accordingly, the output voltage $V_{OUT}$ at the node 358 is generated for a duration determined by the second predetermined duration T2 to burn the fuse.

Figure 5:
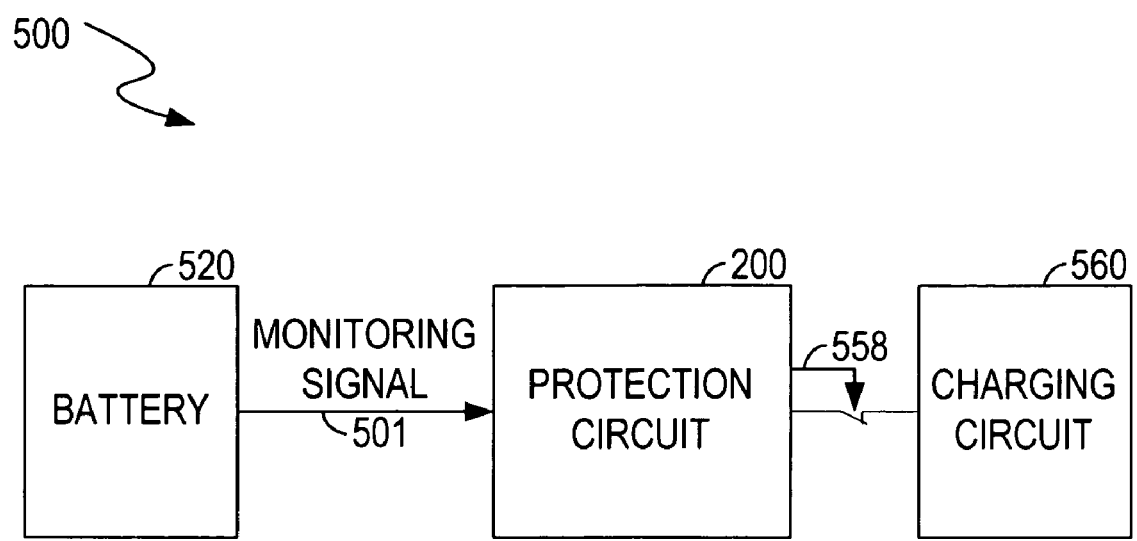
FIG. 5 is a block diagram showing a battery system according to one embodiment of the present invention.

FIG. 5 shows a battery system 500 according to one embodiment of the present invention. In the embodiment of FIG. 5, the battery system 500 includes a battery 520, a protection circuit 200, and a charging circuit 560. The protection circuit 200 in the FIG. 5 is similar to the protection circuit 200 shown in the FIG. 2.

While the charging circuit 560 charges the battery 520, the monitoring signal 501 indicative of the status of the battery 520 can be provided to the protection circuit 200. The protection circuit 200 can compare the monitoring signal 501 with a reference signal to determine if an undesired condition occurs in the battery 520 as described above. If the undesired condition occurs, the protection circuit 200 can generate a triggering signal 558 for disconnecting the battery 520 from the charging circuit 460. In one embodiment, the triggering signal 558 lasts for a predetermined duration and can be used to completely disconnect the battery 520 from the charging circuit 560.

Although the protection circuit 200 is described with respect to a battery system, the present invention is not so limited. For example, the protection circuit 200 can also be coupled to a battery and a load. When an undesired condition occurs in the battery, e.g., an under-voltage condition, the protection circuit 200 can be used to disconnect the battery from the load.

Figure 6:
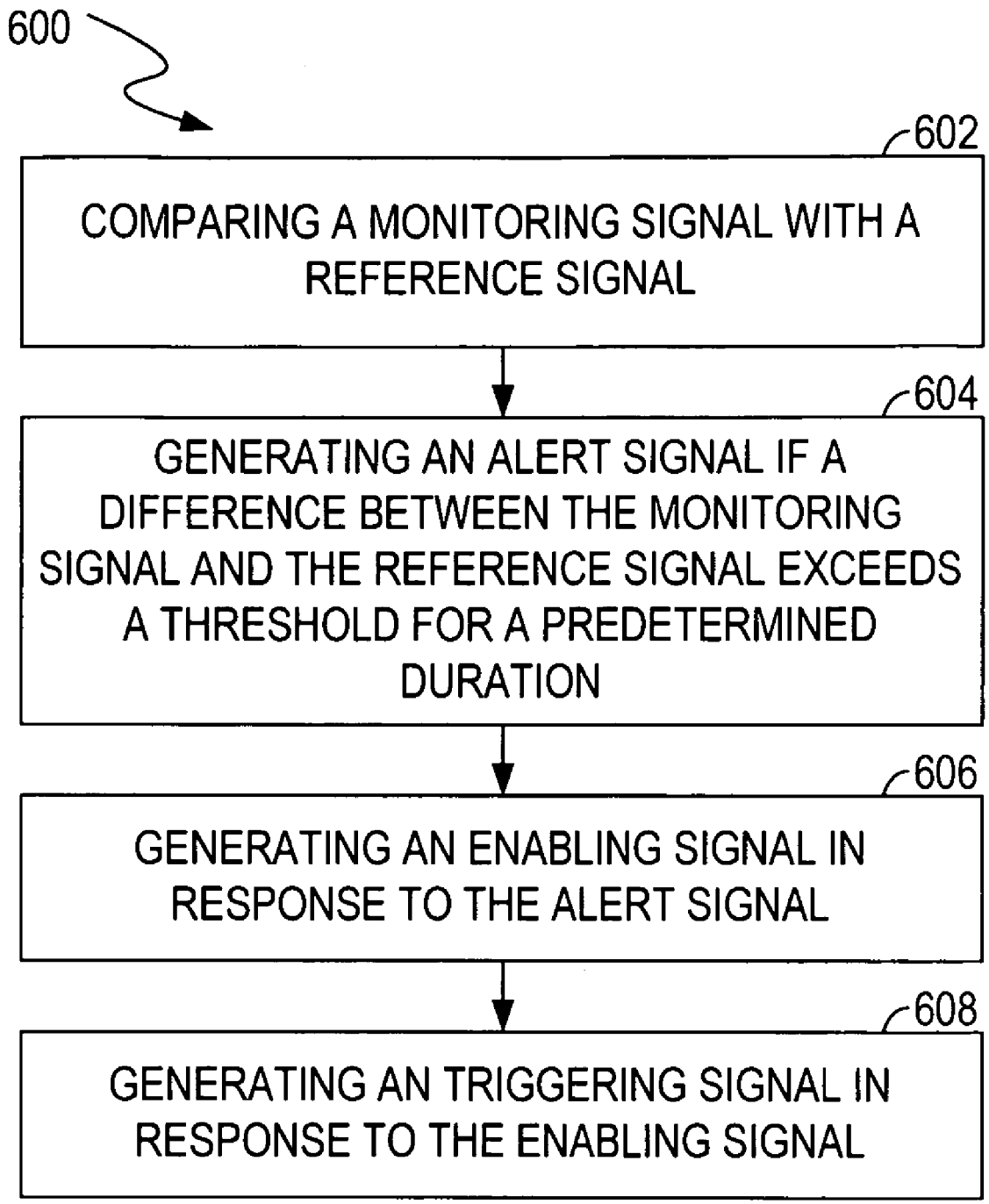
FIG. 6 is a flowchart of operations performed by a protection circuit according to one embodiment of the present invention.

FIG. 6 shows a flowchart 600 of flowchart of operations performed by a protection circuit according to one embodiment of the present invention. The FIG. 6 is described in combination with FIG. 3.

At 602, a monitoring signal 201 is compared a reference signal. For example, the first comparator 322 in the detection block 220 compares the monitoring signal 201 with the reference signal to determine if the difference between the monitoring signal 201 and the reference voltage exceeds a threshold. If the difference exceeds the threshold, the signal 354 which is "1" is generated and output to the measuring block 324. Otherwise, the signal 354 is logic "0".

At 604, an alert signal 352 is generated if the difference between the monitoring signal 201 and the reference signal exceeds a threshold for a first predetermined duration. More specifically, if the difference exceeds the threshold, the signal 354 which is "1" is provided to the measuring block 324. Then, the switch 334 can be turned on and the switch 364 can be turned off. Thus, the capacitor 374 can be charged by the current source 384. The voltage drop across the capacitor 374 can be increased accordingly. The voltage drop across the capacitor 374 can indicate the duration when the difference between the monitoring signal 201 and the reference voltage exceeds the threshold. The comparator 336 compares the voltage drop across the capacitor 374 with the reference voltage 366. When the voltage drop across the capacitor 374 exceeds the reference voltage 366, the confirming block 326 can determine the undesired condition occurs and generate the alert signal 252.

At 606, the enabling signal 256 is generated by the timer 260 in response to the alert signal 252. As described above, the enabling signal 256 lasts for the second predetermined duration.

At 608, the triggering signal, e.g., output voltage $V_{OUT}$, is generated by the protection enable block 280 in response to the enabling signal 256 so as to perform a protection function. The duration of the triggering signal is determined by the second predetermined duration. During the duration of the triggering signal, the fuse can be completely burnt.

While the foregoing description and drawings represent the embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention not limited to the foregoing description.

What is claimed is:

1. A protection circuit, comprising:
   a detection block configured to compare a first voltage of a monitoring signal with a first reference voltage and for generating a second voltage that increases with time while said first voltage exceeds said first reference voltage, wherein if said second voltage increases to greater than a second reference voltage then an alert signal is generated;
   a timer coupled to said detection block and configured to generate an enabling signal in response to said alert signal; and
   a protection enable block coupled to said timer and configured to perform a protection function in response to said enabling signal;
   wherein if a difference between said monitoring signal and said reference signal exceeds a threshold continuously for a first predetermined duration, wherein said detection block further comprises a capacitor that is charged up to a voltage that is greater than or equal to a reference voltage by a current source while said difference exceeds said threshold continuously for said first predetermined duration, such that achieving said voltage triggers generation of said alert signal.

2. The protection circuit of claim 1, wherein said protection function comprises burning a fuse.

3. The protection circuit of claim 1, further comprising:
   a reset block coupled to said timer and for resetting said timer.

4. The protection circuit of claim 1, wherein said monitoring signal indicates a status of a battery, and wherein said protection function comprises protecting said battery.

5. The protection circuit of claim 1, wherein said detection block is operable for detecting an undesirable condition.

6. The protection circuit of claim 5, wherein said undesirable condition comprises an over voltage condition.

7. The protection circuit of claim 5, wherein said undesirable condition comprises an under voltage condition.

8. The protection circuit of claim 5, wherein said undesirable condition comprises an over current condition.

9. The protection circuit of claim 5, wherein said undesirable condition comprises an over temperature condition.

10. The protection circuit of claim 1, wherein said detection block comprises:
    a comparator operable for comparing said first voltage and said first reference voltage; and
    a measuring block coupled to said comparator and operable for measuring a time duration when said first voltage exceeds said first reference voltage.

11. The protection circuit of claim 10, wherein said measuring block comprises:
    a capacitor;
    a first switch coupled to said capacitor in series; and
    a second switch coupled to said capacitor in parallel.

12. The protection circuit of claim 1, wherein said protection enable block comprises:
    a resistor; and
    a switch for coupling said resistor to ground, wherein said switch is controlled by said enabling signal.

13. A system, comprising: a charging circuit configured to charge a battery; and
    a protection circuit coupled to said charging circuit, said protection circuit comprising:
        a detection block configured to compare a first voltage of a monitoring signal indicative of a status of said battery with a first reference voltage, and also configured to generate a second voltage that increases with time while said first voltage exceeds said first reference voltage, an alert signal is generated in response to said second voltage increasing to greater than a second reference voltage if a difference between said monitoring signal and said reference signal exceeds a threshold continuously for a first predetermined duration, wherein said detection block further comprises a capacitor that is charged up to a voltage that is greater than or equal to a reference voltage by a current source while said difference exceeds said threshold continuously for said first predetermined duration, such that achieving said voltage triggers generation of said alert signal;
        a timer coupled to said detection block and configured to generate an enabling signal in response to said alert signal; and
        a protection enable block coupled to said timer and configured to generate a triggering signal in response to said enabling signal to disconnect said battery from said charging circuit.

14. The system of claim 13, wherein said triggering signal is operable for burning a fuse.

15. The system of claim 13, wherein said protection circuit further comprises a reset block coupled to said timer and operable for resetting said timer.

16. The system of claim 13, wherein said detection block compares said monitoring signal with said first reference voltage to detect an undesirable condition of said battery.

17. The system of claim 16, wherein said undesirable condition comprises an over voltage condition.

18. The system of claim 16, wherein said undesirable condition comprises an under voltage condition.

19. The system of claim 16, wherein said undesirable condition comprises an over current condition.

20. The system of claim 16, wherein said undesirable condition comprises an over temperature condition.

21. The system of claim 13, wherein said detection block comprises:
    a comparator operable for comparing said monitoring signal with said first reference voltage to determine if said difference between said monitoring signal and said first reference voltage exceeds said threshold;
    a measuring block coupled to said comparator and operable for measuring a second time duration when said difference between said first voltage and said first reference voltage exceeds a threshold; and
    a confirming block coupled to said measuring block and operable for comparing said time duration with a predetermined duration and for generating said alert signal if said time duration is greater than said predetermined duration.

22. A method, comprising: comparing a first voltage of a monitoring signal with a first reference voltage;
    generating a second voltage that increases with time while said first voltage exceeds said reference voltage;
    generating an alert signal if said second voltage increases to greater than a second reference voltage;
    generating an enabling signal in response to said alert signal; and performing a protection function in response to said enabling signal;

wherein if a difference between said monitoring signal and said reference signal exceeds a threshold continuously for a first predetermined duration, wherein said detection block further comprises a capacitor that is charged up to a voltage that is greater than or equal to a reference voltage by a current source while said difference exceeds said threshold continuously for said first predetermined duration, such that achieving said voltage triggers generation of said alert signal.

23. The method of claim 22, wherein said protection function comprises burning a fuse.

24. The method of claim 22, wherein said monitoring signal indicates a status of a battery.

* * * * *